March 13, 1973 W. E. WRIGHT Re. 27,598
DISPOSAL SYSTEM FOR CONTAMINATED HYDROGEN FROM A NUCLEAR REACTOR
Original Filed Feb. 8, 1966
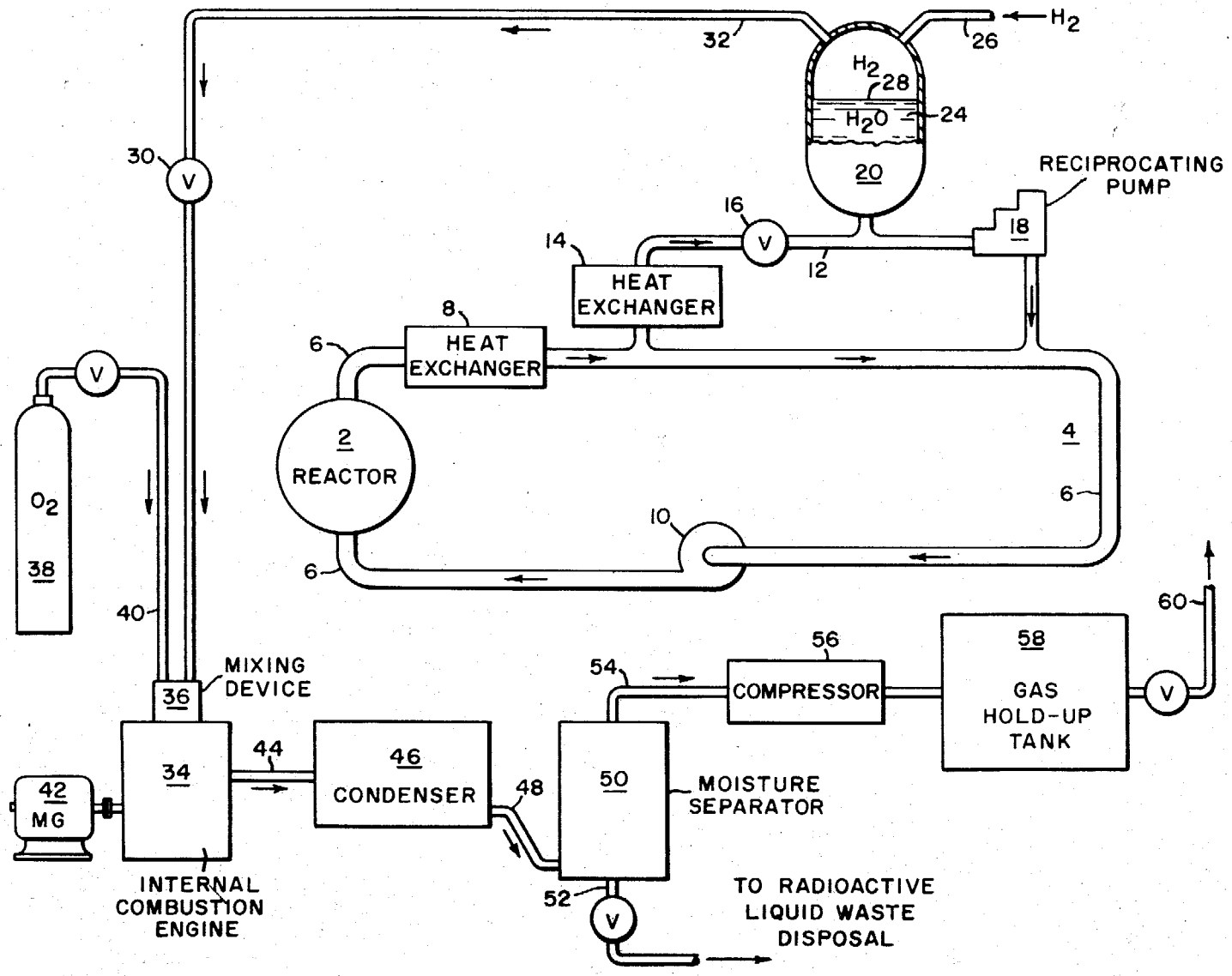
WITNESSES
Robert C. Baird
Lee P. Johns
INVENTOR
William E. Wright.
BY
Frederick Shapiro
ATTORNEY United States Patent Office Re. 27,598
Reissued Mar. 13, 1973

27,598
DISPOSAL SYSTEM FOR CONTAMINATED HYDROGEN FROM A NUCLEAR REACTOR

William E. Wright, Pittsburgh, Pa., assignor to Westinghouse Electric Corporation, Pittsburgh, Pa.

Original No. 3,362,883, dated Jan. 9, 1968, Ser. No. 525,909, Feb. 8, 1966. Application for reissue Sept. 21, 1969, Ser. No. 869,970
Int. Cl. G21c *19/32*
U.S. Cl. 176—37 4 Claims

Matter enclosed in heavy brackets [ ] appears in the original patent but forms no part of this reissue specification; matter printed in italics indicates the additions made by reissue.

ABSTRACT OF THE DISCLOSURE

An apparatus for disposing of contaminated hydrogen gas containing potentially explosive quantities of oxygen and noxious proportions of radioactive fission gases; the apparatus including an internal combustion engine for converting small increments of hydrogen to water.

Pressurized water cooled nuclear reactors include a water cooling system for transferring heat energy from the nuclear fuel to a steam generating heat exchanger. Among other components, the cooling system includes a surge tank in which the changes in system water volume are accommodated.

The surge tank is a closed vessel normally containing water in the lower portion and hydrogen in the upper portion.

Hydrogen, rather than some other gas, is used because hydrogen combines with oxygen dissolved in the water and thus minimizes the oxygen content of the water. Free oxygen in the water is undesirable because of its corrosive effect on metal parts constituting the reactor as well as the water cooling system.

Associated with the foregoing is the fact that radioactive fission gases such as krypton and xenon become dissolved in the water if a leak develops in any of the fuel tubes within the reactor. Such dissolved gases are carried by the water to the surge tank where they escape into the hydrogen gas atmosphere above the water. If the concentration of such gases is allowed to become too great, the surge tank gas volume becomes undesirably radioactive.

Thus, it is desirable to periodically purge and surge tank of the contaminated hydrogen gas blanket. Also, whenever the cooling system is opened for maintenance or plant refueling, the hydrogen blanket must be removed. In both of these cases an unusual waste product—hydrogen contaminated with radioactive gases—requires disposal.

Various means of oxidizing the hydrogen to eliminate the combustibility danger of the mixture have been employed, such as using a platinum catalytic grid or a flame recombiner. Another method involves the dilution of the hydrogen with large quantities of an inert gas such as nitrogen. However, such methods have serious disadvantages. The method of diluting with nitrogen requires the storage of large volumes of gas for long periods of time. Both types of recombiners have consistently presented operating difficulties that primarily involve intermittent operation.

It has been found that the problem may be overcome by burning the contaminated hydrogen in an internal combustion engine in which the hydrogen is mixed with measured amounts of oxygen and used as the engine fuel. Such a procedure is satisfactory because not only is it not subject to the operating difficulties inherent in prior procedures, but it is relatively inexpensive and simple to use and it is inherently fail-safe.

Accordingly, it is a general object of this invention to provide contaminated hydrogen disposal system by burning hydrogen in small batches, i.e., a combustion chamber charge, thereby burning it in an inherently safe manner which is at the same time simply and easily accomplished.

It is another object of this invention to provide a contaminated hydrogen disposal system which reduces large volumes of contaminated hydrogen to water, plus chemically inert radioactive gases, and small quantities of excess oxygen. The relatively small resultant volumes of liquid and non-combustible gases can be processed routinely in the radioactive waste disposal systems that are a part of all nuclear power plants.

Finally, it is an object of this invention to satisfy the foregoing objects and desiderata in a simple and expedient manner.

The accompanying drawing is a schematic view of a nuclear reactor system having a hydrogen batch burning system associated therewith in accordance with the principles of the invention.

The present invention involves a system for eliminating hydrogen gas which has been contaminated with radioactive gaseous fission products during the operation of a nuclear reactor. In a water coolant system for a nuclear reactor a conduit is provided for circulating the coolant from the reactor and through a heat exchanger and back to the reactor. The system also includes a surge tank in which excess water is stored for maintaining a relatively constant water volume in the system. The water within the surge tank occupies the lower portion thereof and the upper portion is occupied by hydrogen gas which combines with any oxygen in the water to prevent oxygen from corroding metal parts of the reactor coolant system.

During operation of the system the hydrogen may gradually become contaminated with radioactive fission products and thus becomes an undesirable source of radition. As a result, it is desirable to eliminate the source by periodically burning off the hydrogen and replacing it with a new uncontaminated supply. For that purpose an internal combustion engine is provided where the contaminated hydrogen is united with oxygen to form water. Other oxidizers such as air or hydrogen peroxide may be used. Subsequently, the water is separated from the non-combustible radioactive gases and the contaminated water and non-combustible gases are separately disposed of, such as in sealed containers buried in the ground.

In the drawing a nuclear reactor 2 is provided with a water coolant system 4, which system includes a conduit 6, a heat exchanger 8, and a centrifugal pump 10. An associated system for accommodating changes in the water volume, such as when the reactor heats up from a cold condition, is provided and includes a conduit 12, a heat exchanger 14, a letdown valve 16, a reciprocating pump 18, and a surge tank 20. The heat exchanger 8 may be of conventional construction. The pump 10 operates primarily to maintain a constant flow of water around the closed circuit of the conduit 6 and through the reactor 2.

The surge tank 20 has the primary purposes of compensating for increases and decreases in the water volume of the system such as when the water circuit is heated up or cooled down. The lower portion of the tank 20 is occupied by coolant water 24 and the upper portion is occupied primarily by hydrogen gas, which is introduced through an inlet conduit 26. An interface 28 of water and hydrogen gas exists within the surge tank.

During operation of the reactor 10 the water frequently absorbs contaminants such as fission products and oxygen formed by hydrolysis. In order to prevent corrosion of the metal parts in the reactor coolant system, the oxygen must be eliminated from the water as completely as possible.

The hydrogen gas serves that purpose. As the water 24 circulates in and out of the surge tank, the hydrogen gas is absorbed at the interface 28 and combines chemically with any oxygen dissolved in the water.

Over a period of time, however, the hydrogen gas may become contaminated with various fission products such as krypton and xenon gases which are highly radioactive and, therefore, the gas volume becomes an undesirable radioactivity source. As a result, the hydrogen gas is periodically replaced. Also, when the reactor 10 is shut down for maintenance or fuel replacement purposes, the hydrogen blanket must be displaced.

Disposal of the hydrogen is accomplished by opening a valve 30 in a conduit 32 which leads to an internal combustion engine 34 where the hydrogen is mixed in a mixing device 36 with oxygen gas leading from a source 38 of oxygen through a conduit 40. The engine 34 is started by an electric motor 42 and when combustion of the oxygen and hydrogen gases commences, the electric motor is turned off and the engine is self-sustaining so long as there is sufficient hydrogen to maintain combustion.

The engine 34 operates on an oxygen rich mixture so that the combustion process is as follows:

$$H_2+O_2+\text{gaseous fission products} \rightarrow H_2O+O_2+\text{gaseous fission products}+\text{heat}$$

The process is started by turning on the motor 42 and drawing the hydrogen and oxygen mixture into the combustion chambers of the engine 34. When combustion stops for any reason, such as a malfunction or completion of the burning of the available hydrogen, the process stops automatically.

The combustion products include water in the form of steam and the non-combustible radioactive gases which entered the hydrogen gas at the gas-water interface 28 within the tank 20. The combustion products leave the burner 34 via the outlet 44, and are transmitted to a condenser 46 where the steam is reduced to water. The water and non-combustible radioactive gases then flow through an outlet 48 to a moisture separator 50. Inasmuch as the water contains radioactivity, it is removed from the moisture separator 50 through an outlet 52 and is disposed of in a conventional manner for handling radioactive liquid waste products.

The non-combustible radioactive gases leave the moisture separator 50 via an outlet 54 and are compressed in a gas compressor 56 from where they are transmitted to a gas holding tank 58 to decay to a safe radioactive level before being disposed of through a conduit 60 leading to a stack (not shown).

Accordingly, the device and process of the present invention is inherently fail-safe. The volume of gas accumulating and requiring expensive storage facilities is maintained at a minimum level. The system involves a relatively inexpensive facility which has application in all plants that use a hydrogen blanket over a liquid which may contain radioactive gases.

Finally, though the device of the present invention is disclosed as useful in a nuclear reactor system, it is equally useful in the chemical industry where combustible gases to be disposed of are contaminated or noxious.

Various modifications may be made within the spirit of the invention.

What is claimed is:

1. In a water coolant system for a nuclear reactor wherein a conduit is provided for circulating water from a reactor and through a heat exchanger and to the reactor, and wherein a surge tank communicates with the conduit for storing water containing contaminants in the lower tank portion and for containing hydrogen gas in the upper tank portion, the combination with said tank of a gas fueled internal combustion engine means for burning the hydrogen gas with oxygen, said engine means including a hydrogen-oxygen mixing device, conduit means between the upper tank portion and the engine means for conveying hydrogen gas to the mixing device, and a supplemented source of oxygen attached to the mixing device to supply oxygen in an amount in excess to react with the hydrogen to form water by combustion in the engine means.

2. The device of claim 1 in which the engine means includes means for separating water resulting from the combustion of hydrogen and oxygen from non-combustible contaminants in the contaminated hydrogen gas.

3. The device of claim 1 in which the engine means includes an engine and means for starting the engine.

*4. A system for disposing of hydrogen gas from a nuclear pressurized water system which includes a reactor, heat exchanger and a pump for circulating water through the reactor in a closed circuit for cooling purposes, and wherein the pressurized water system contains varying quantities of hydrogen contaminated by radioactive fission gases resulting from reactor operation, the improvement comprising:*

*a conduit connected to the pressurized water system for withdrawing the contaminated hydrogen therefrom;*

*a separate source of oxygen not associated with the pressurized water system;*

*means connecting the separate oxygen source and contaminated hydrogen from the pressurized water system with a gas mixing device to form a combustible gas mixture;*

*an internal combustion engine coupled with the mixing device for receiving and burning the hydrogen-oxygen mixture to form water, heat and contaminated non-combustible gases; and*

*separation means connected with the engine exhaust for separating the water and contaminated non-combustible gases for later delivery to separate storage facilities.*

References Cited

The following references, cited by the Examiner, are of record in the patented file of this patent or the original patent.

UNITED STATES PATENTS

| | | | |
|---|---|---|---|
| 2,183,674 | 12/1939 | Erren | 123—37 X |
| 3,028,327 | 4/1962 | Weeks | 176—37 |
| 3,041,134 | 6/1962 | Weeks | 176—37 |
| 3,113,913 | 12/1963 | Newton | 176—37 |
| 3,166,478 | 1/1965 | Lindstrom | 176—37 |

FOREIGN PATENTS

| | | | |
|---|---|---|---|
| 221,254 | 8/1924 | Great Britain | 123—27 G |

OTHER REFERENCES

J. W. Simpson: Proceedings of International Conference on the Peaceful Uses of Atomic Energy, vol. 13, Power Reactors, pp. 211, 212, 220, 221, 222, 223.

REUBEN EPSTEIN, Primary Examiner